(12) United States Patent
Saito et al.

(10) Patent No.: US 6,533,704 B2
(45) Date of Patent: Mar. 18, 2003

(54) CONTROL SYSTEM FOR VEHICULAR AUTOMATIC TRANSMISSION

(75) Inventors: Yoshiharu Saito, Wako (JP); Masatoshi Sakato, Wako (JP); Moriaki Tokuda, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 17 days.

(21) Appl. No.: 09/850,104

(22) Filed: May 8, 2001

(65) Prior Publication Data

US 2001/0044359 A1 Nov. 22, 2001

(30) Foreign Application Priority Data

May 9, 2000 (JP) ........................................ 2000-135368

(51) Int. Cl.[7] ........................... F16H 61/20; B60K 41/28
(52) U.S. Cl. ............................... 477/92; 477/93; 477/901
(58) Field of Search ........................... 477/71, 73, 92, 477/93, 94, 114, 901

(56) References Cited

U.S. PATENT DOCUMENTS

| | | | | |
|---|---|---|---|---|
| 5,272,630 A | * | 12/1993 | Brown et al. | 192/87.17 |
| 5,460,580 A | * | 10/1995 | Streib | 477/110 |
| 5,741,200 A | * | 4/1998 | Taniguchi et al. | 477/114 |
| 5,813,942 A | * | 9/1998 | Nakagawa et al. | 477/120 |
| 5,820,515 A | * | 10/1998 | Fukaya et al. | 477/120 |
| 5,893,816 A | * | 4/1999 | Ashida | 477/111 |
| 6,269,295 B1 | * | 7/2001 | Gaugush et al. | 192/220.1 |

FOREIGN PATENT DOCUMENTS

| | | |
|---|---|---|
| JP | 11-193866 | 7/1999 |
| JP | 11-230329 | 8/1999 |

* cited by examiner

Primary Examiner—Ankur Parekh
(74) Attorney, Agent, or Firm—Armstrong, Westerman & Hattori, LLP (57) ABSTRACT

A control system (a control valve CV and an electronic control unit ECU) for an automatic transmission TM performs an automatic control to select and establish a speed ratio from a plurality of speed ratios in response to the condition of a vehicle which is set in a drive range. This control system creates a neutral condition if the vehicle is stationary with the brake of the vehicle being actuated and the accelerator for the engine being turned off while the transmission is set in a drive range. The control system is also equipped with an engine output control device 50 that adjusts the engine output which is input into the transmission when the transmission in the drive range leaves the neutral condition and starts to establish any of the speed ratios in the drive range.

11 Claims, 9 Drawing Sheets

Fig. 10

CONTROL SYSTEM FOR VEHICULAR AUTOMATIC TRANSMISSION

RELATED APPLICATIONS

This application claims the priority of Japanese Patent Application No. 2000-135368 filed on May 9, 2000, which is incorporated herein by reference.

FIELD OF THE INVENTION

The present invention relates to a vehicular automatic transmission (including a continuously variable transmission) which is constructed to perform an automatic control for establishing speed change ratios in response to changes in the driving condition while the driver manipulates the shift lever to select drive ranges.

BACKGROUND OF THE INVENTION

A vehicular automatic transmission comprises a speed change mechanism which includes a plurality of mechanical power transmission paths and is connected to an engine through, for example, a torque converter. Selection of or switching to an appropriate power transmission path, i.e., an appropriate speed change ratio, is automatically performed on the basis of, for example, the accelerator opening and the vehicle speed. Generally, a vehicle with an automatic transmission is equipped with a shift lever, which is operated by a driver. When the driver manipulates the shift lever, a range of speed change ratios or a drive range (for example, a reverse drive range, a neutral range, a forward drive range) is selected in response to the manipulation of the shift lever, and the speed change ratio is automatically adjusted or controlled within the selected drive range (usually in a forward drive range).

When a vehicle equipped with such an automatic transmission is stopped while the transmission is set in the forward drive range, a so-called creeping phenomenon occurs because the driving force from the engine which is idling is transmitted to the transmission through the torque converter and then to the wheels. This creeping phenomenon is beneficial for smooth starting under a certain condition, for example, when the vehicle stops and then starts on an upward slope, but not welcome when the vehicle should be kept stationary. At present, to keep the vehicle stationary, the brake must be operated against the creeping force, which is generated by the engine, so this brake operation reduces the mileage allowance or the fuel efficiency of the vehicle.

To solve this problem, a method to improve the fuel efficiency of such an automatic transmission is proposed. In this method, while the vehicle is kept stationary with the brake pedal being stepped or pressed for brake operation and the accelerator being substantially closed, the transmission is set into a neutral condition although the selection of the drive range is kept unchanged (for example, Japanese Laid-Open Patent Publication Nos. H11-193866, H11-230329, etc.).

By the way, it is a difficult task to make the vehicle start quickly and smoothly without any delay from the stationary condition in which the transmission is set in the above mentioned neutral condition in the forward drive range when the brake pedal is released for a creeping and then the accelerator pedal is stepped. Especially, while the vehicle is stationary on an upward slope and when the brake is released, if there is a delay in the response of the transmission to switch from the neutral condition to a drive condition that transmits the driving force to the wheels, then the vehicle moves backward a little depending on the inclination of the road before it starts traveling forward. If such a backward movement occurs, then the driver may feel that something is wrong with the shift control system of the transmission.

SUMMARY OF THE INVENTION

It is an object of the present invention to provide a control system for a vehicular automatic transmission, which system enables the vehicle to creep or start quickly and smoothly from a stationary condition in which the transmission is set in a neutral condition in a forward drive range when the brake pedal is released.

Particularly, it is an object of the present invention to provide a control system for a vehicular automatic transmission, which system performs a quick and flawless shift control to establish a forward drive condition from a neutral condition in which the vehicle has been kept stationary on an upward slope, with little moving back of the vehicle when the brake is released.

To realize the above objectives, the present invention provides a control system (for example, the control valve CV and the electronic control unit ECU described as a preferred embodiment in the following section) for a vehicular automatic transmission (for example, the automatic transmission TM described in the following section). The control system according to the present invention performs an automatic control for selecting and establishing a speed ratio (speed change gear ratio) in response to the condition of the vehicle set in a drive range, and the control system creates a neutral condition if the vehicle is stationary with the brake of the vehicle being actuated and the accelerator for the engine being turned off (i.e., the accelerator pedal is released to turn off the accelerator, but the engine is kept idling) while the transmission is set in the drive range. This control system is equipped with an engine output control device (the engine output control device 50 described in the following section) that adjusts the engine output being input into the transmission when the transmission leaves the neutral condition and starts to establish a predetermined speed ratio in the drive range.

It is preferable that the control system include an inclination detector (the inclination sensor 37 described in the following section) which detects the inclination of the vehicle in the direction of the vehicle's traveling. With this arrangement, the engine output control device adjusts the engine output in correspondence to the inclination detected by the inclination detector. In this case, if the inclination in the vehicle's traveling direction detected by the inclination detector indicates that the road surface is upwardly sloped, then the engine output control device preferably increases the engine output. On the other hand, if the inclination in the vehicle's traveling direction detected by the inclination detector indicates that the road surface is downwardly sloped, then the engine output control device preferably decreases the engine output.

The control system according to the present invention can control quickly and smoothly the operation of the transmission from a neutral condition where the vehicle is stationary on an upwardly sloped road to a driving condition where the brake pedal is released to make the vehicle start or creep by adjusting appropriately the power from the engine which is input into the transmission by the engine output control device. For example, in a case where the vehicle has stopped on an ascending road, the control system can increase the engine output by the engine output control device to achieve a relatively large creeping force. In this way, the vehicle is prevented from receding, which may otherwise happen depending on the magnitude of the inclination, or the amount of the receding can be greatly reduced. As a result, the starting and the creeping of the vehicle is controlled without any clumsiness and with comfort.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings, which are given by way of illustration only and thus are not limitative of the present invention.

DESCRIPTION OF THE PREFERRED EMBODIMENTS

Figure 1:
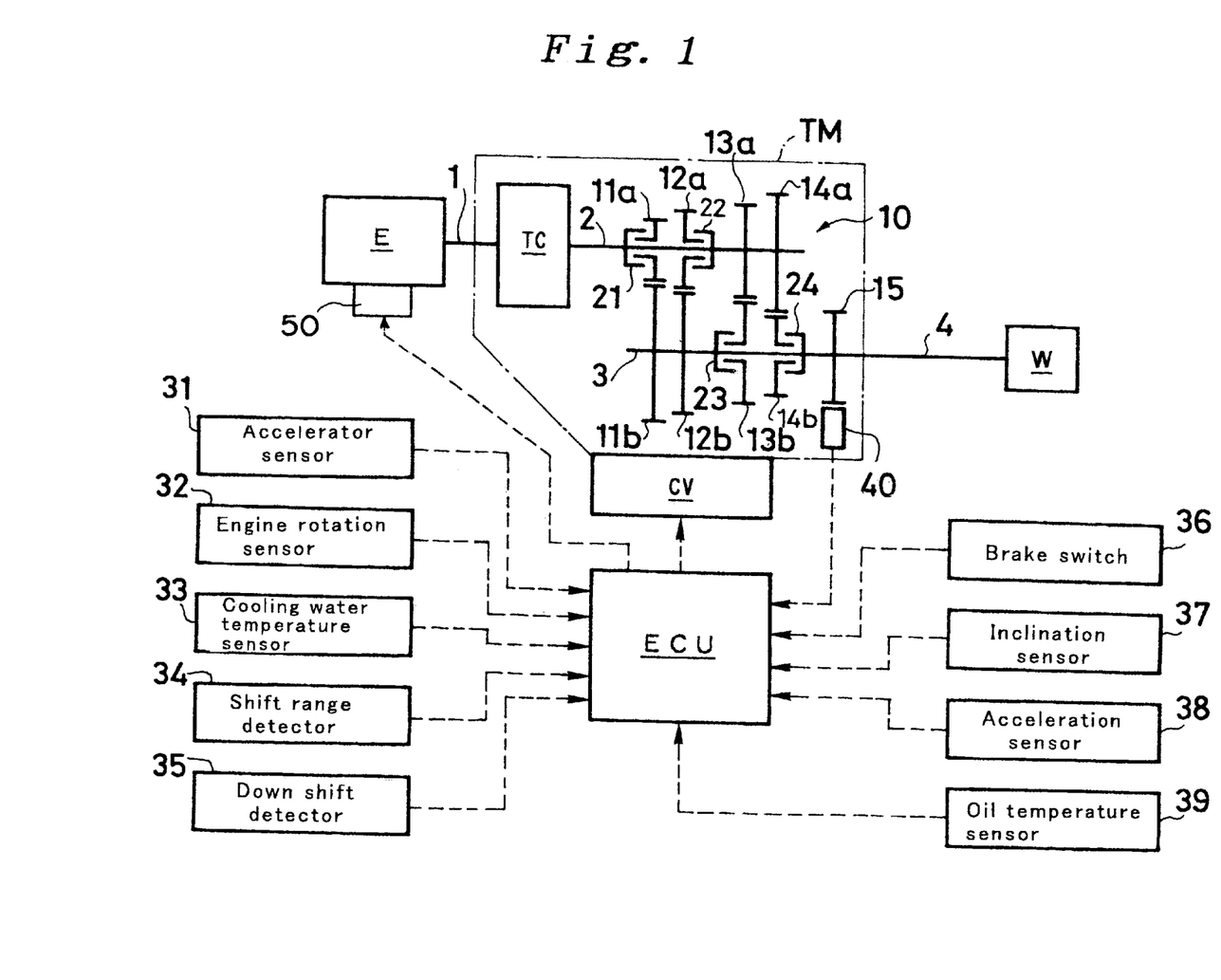
FIG. 1 is a schematic diagram which shows power transmission paths and a control system of a vehicular automatic transmission according to the present invention.

Referring to the drawings, a preferred embodiment according to the present invention is described. FIG. 1 shows the power transmission paths of a vehicular automatic transmission and the construction of a control system which is designed for this transmission according to the present invention. This automatic transmission TM comprises a torque converter TC, which is connected to the output shaft 1 of an engine E, a parallel shaft speed change mechanism 10, which includes a transmission input shaft 2 connected to the turbine of the torque converter TC, and a control valve CV, which is used for controlling the clutch engagement of the parallel shaft speed change mechanism 10 for automatic speed ratio change.

The parallel shaft speed change mechanism 10 includes a transmission input shaft 2 and a transmission output shaft 3, which are disposed freely rotatable and in parallel with each other, four gear trains (namely, LOW gear train 11a and 11b, SECOND speed gear train 12a and 12b, THIRD speed gear train 13a and 13b, and FOURTH speed gear train 14a and 14b), which are disposed between the input and output shafts 2 and 3, and a plurality of clutches (namely, LOW clutch 21, SECOND clutch 22, THIRD clutch 23 and FOURTH clutch 24), each of which selectively engages a corresponding gear train for power transmission. As the output shaft 3 is connected through a drive shaft 4 to the wheels W, the output of the engine E is transmitted through the torque converter TC to the transmission input shaft 2 and then through a gear train which is selected through an appropriate clutch engagement carried out by the control system to the transmission output shaft 3. This driving force is then transmitted through the drive shaft 4 to the wheels W, which carry and move the vehicle forward or rearward, respectively.

On the transmission output shaft 3 (or on the drive shaft 4, which is connected with the output shaft 3), a rotation detection gear 15 is provided, and an output rotation sensor 40 is provided opposite to this rotation detection gear 15. This output rotation sensor 40 is capable of detecting a minute amount of rotation of the transmission output shaft 3, and it is made of, for example, a magnetoresistant element, which is generally known as a semiconductor sensor.

The shift of this automatic transmission TM is executed by selectively engaging one of the clutches, i.e., the LOW clutch 21, the SECOND clutch 22, the THIRD clutch 23 and the FOURTH clutch 24, through the actuation of the control valve CV, which is controlled automatically by an electronic control unit ECU in response to the drive range selected by the manipulation of the shift lever, the accelerator opening of the engine E, the speed of the vehicle, etc. The drive ranges to be established are a parking range, a reverse drive range, a neutral range, and a forward drive range, and the automatic shift control is performed while the transmission is set in the forward drive range.

At first, the automatic shift control performed by the electronic control unit ECU is described in reference to FIG. 1. The electronic control unit ECU receives signals from an accelerator sensor 31, which detects the accelerator opening of the engine E, from an engine rotation sensor 32, which detects the rotation of the engine, a cooling water temperature sensor 33, which detects the temperature of the engine cooling water, from a shift range detector 34, which detects the drive range selected by the shift lever, from a downshift detector 35, which detects a downshift (especially to the THIRD, SECOND or FIRST speed), from a brake switch 36, which detects the downward movement of the brake pedal, from an inclination sensor 37, which detects the inclination of the vehicle in the traveling direction, from an acceleration sensor 38, which detects the acceleration G of the vehicle in the traveling direction, and from a T/M oil temperature sensor 39, which detects the temperature of the hydraulic oil of the transmission. The electronic control unit ECU controls the actuation of the control valve CV in correspondence to these detection signals and performs the automatic shift control.

The engine E is equipped with an engine output control device 50, whose operation is controlled by the electronic control unit ECU, which sends control signals. Therefore, the operation of the engine E is actually controlled by the electronic control unit ECU. More specifically, the engine output control device 50 may comprise a throttle device or a secondary air passage control device. If the engine output control device 50 comprises a throttle device, then the throttle device should include a throttle actuator which electrically controls the throttle opening of the engine. In this case, the electronic control unit ECU detects the pressing of the accelerator pedal electrically and sends signals to control the actuation of the throttle actuator accordingly. In other words, this is a so-called "drive-by-wire" (DBW) type device.

Figure 2:
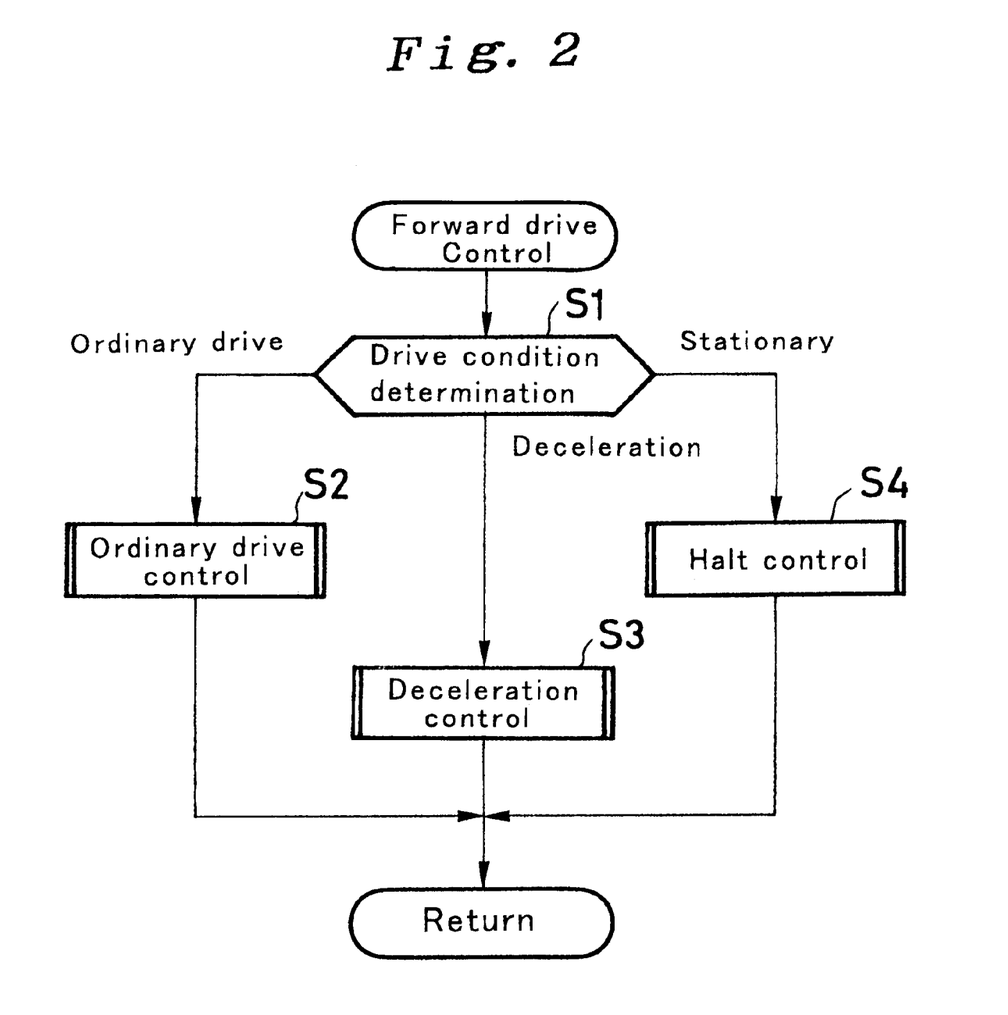
FIG. 2 is a flowchart which describes an automatic shift control routine executed for a forward drive range established in the above automatic transmission.

Now, in reference to FIG. 2, a description is made of an automatic shift control which is executed by the electronic control unit ECU when the forward drive range is selected as a shift range. As shown in the flowchart of FIG. 2, the control of the vehicle traveling in the forward drive range is executed as follows. At first, the condition of the vehicle is determined at Step S1. If the vehicle is in a normal driving condition, then the control flow proceeds to Step S2, where an ordinary drive control is executed. On the other hand, if it is in a deceleration, then the control flow proceeds to Step S3, where a deceleration control is executed. However, if the condition is that the vehicle is stationary, then a halt control is executed at Step S4. The ordinary drive control is an automatic shift control which drives the vehicle in correspondence to the accelerator opening and the vehicle speed. The ordinary drive control is not directly related to the present invention, and such controls are well known in the art, so no further description is made in this respect.

Figure 3:
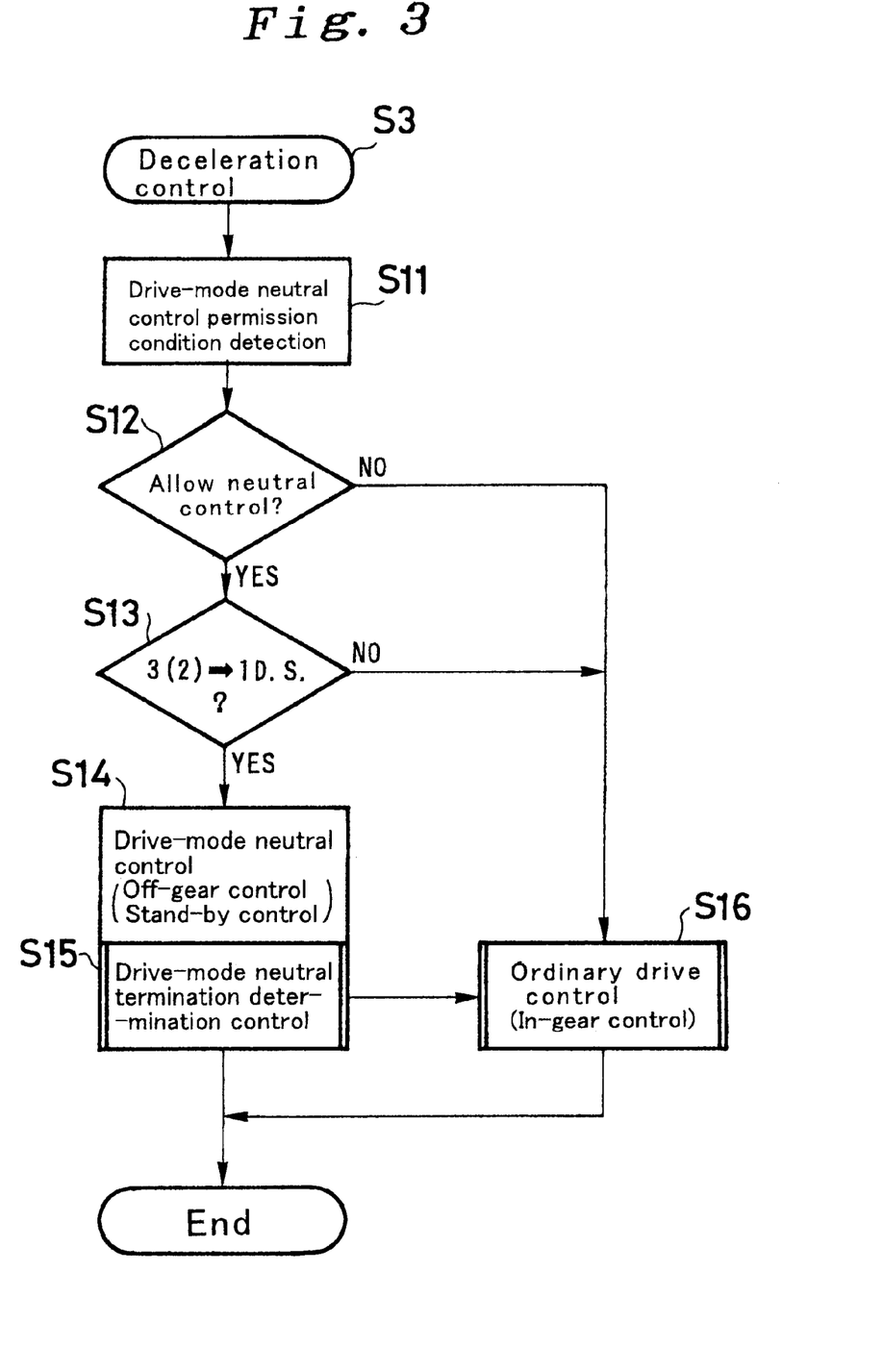
FIG. 3 is a flowchart which describes a deceleration control routine, which is a part of the automatic shift control executed for the forward drive range.

FIG. 3 shows a routine for the deceleration control which is executed at Step S3. This control is executed while the vehicle is traveling and when the accelerator pedal is released to make the accelerator close substantially for deceleration. At first, at Step S11, a detection is made to determine whether conditions necessary for allowing a drive-mode neutral control are satisfied or not. In the deceleration control, the speed change mechanism is set in a neutral condition while the shift range of the transmission is maintained to the forward drive range if the condition is satisfied at a certain phase (for example, the vehicle speed is reduced to about 11 km/h, and the speed ratio is downshifted to the LOW) before the vehicle comes into a halt. This is done for fuel efficiency improvement.

More specifically, the followings are the determinants for allowing the drive-mode neutral control, which are detected at Step S11: the shift range detected by the shift range detector 34 is a "D4" range; the vehicle speed is relatively low (for example, equal to or lower than 11 km/h); the hydraulic oil temperature of the transmission detected by the T/M oil temperature sensor 39 is equal to or higher than a predetermined temperature; the cooling water temperature of the engine detected by the cooling water temperature sensor 33 is equal to or higher than a predetermined temperature; the accelerator opening detected by the accelerator sensor 31 is substantially closed; and the brake switch 36 is turned on, detecting the actuation of the brake.

It is clear from the above predetermined conditions that if the shift range is not in the "D4" range but in another forward drive range, for example, a "2" range or a "1" range, which is intended to maintain the transmission in a speed ratio for a lower vehicle speed, then the transmission is not allowed to be set into a neutral condition. The reason is that if the shift range is set in a range other than the "D4" range, it is considered that the driver intends to effect an engine brake. In this case, the transmission is not allowed to be set into a neutral condition until the vehicle speed becomes substantially low. Also, if the hydraulic oil temperature of the transmission and the cooling water temperature of the engine are lower than the predetermined values, then the transmission is not allowed to be set into a neutral condition. Furthermore, if the accelerator pedal is being pressed, or if the brake pedal is released, then the transmission is not allowed to be set into a neutral condition because such conditions are considered as a prelude for the transmission to return into an ordinary traveling mode.

At Step S12, a determination is made whether the above conditions for the execution of the drive-mode neutral control are satisfied or not. If all the conditions are satisfied, then the control flow proceeds to Step S13, where a determination is made whether a command for a downshift from the THIRD speed (or the SECOND speed) to the FIRST speed (the LOW speed) has been generated or not. As long as all the conditions are met, and a command for such a downshift is not generated, the control flow proceeds to Step S16, where the ordinary drive control (the control executed at Step S2 in FIG. 2) is executed. On the other hand, if such a downshift command is generated, the control flow proceeds to Step S14, where the transmission is set into a neutral condition (referred to as "drive-mode neutral control"). In other words, when the vehicle speed becomes low and a command for a downshift to the FIRST speed is generated, a control to set the transmission into a neutral condition is started. In this way, the transition of the control modes of the transmission is carried out smoothly.

The drive-mode neutral control executed at Step S14 comprises an off-gear control and a stand-by control. The off-gear control reduces the hydraulic pressure of the THIRD speed clutch 23 (or the SECOND speed clutch 22) to a predetermined pressure and starts supplying a hydraulic pressure to the LOW clutch 21, and the stand-by control releases the hydraulic pressure of the THIRD speed clutch 23 (or the SECOND speed clutch 22) but maintain the hydraulic pressure of the LOW clutch 21 at a stand-by pressure, following the off-gear control. The stand-by pressure is the pressure that maintains the LOW clutch 21 in a condition where the clutch is positioned very close to the point of engagement. Therefore, in this condition, if the hydraulic pressure of the LOW clutch 21 is increased a little, then the LOW clutch 21 can immediately start engaging. Such is the neutral condition of the LOW clutch 21 in the stand-by control.

While the drive-mode neutral control is executed in this way, in parallel with this control, a drive-mode neutral termination determination control is executed. In the drive-mode neutral termination determination control, a judgment is made whether to terminate the drive-mode neutral control or not, and if the judgment is to terminate the drive-mode neutral control, then the drive-mode neutral control is terminated.

Figure 4:
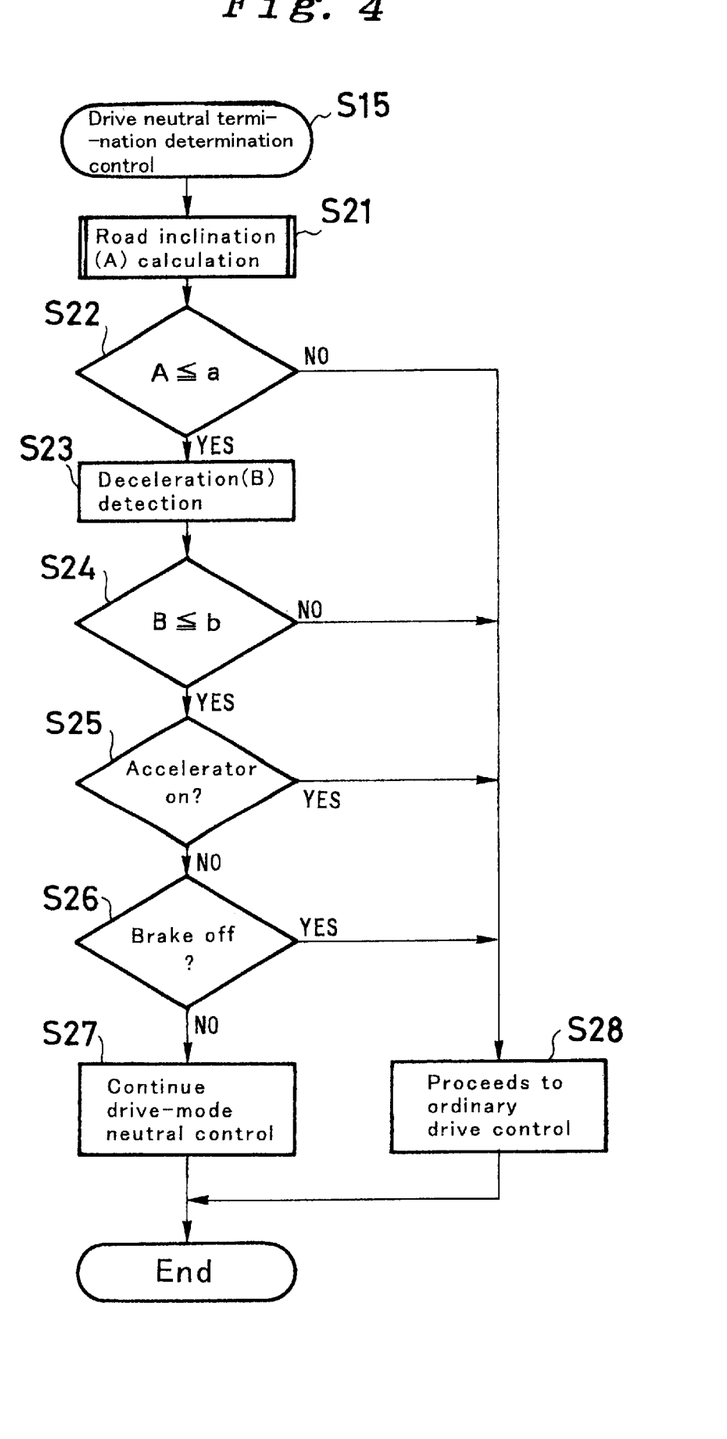
FIG. 4 is a flowchart which describes a drive-mode neutral termination control routine, which is a part of the deceleration control.
Figure 5:
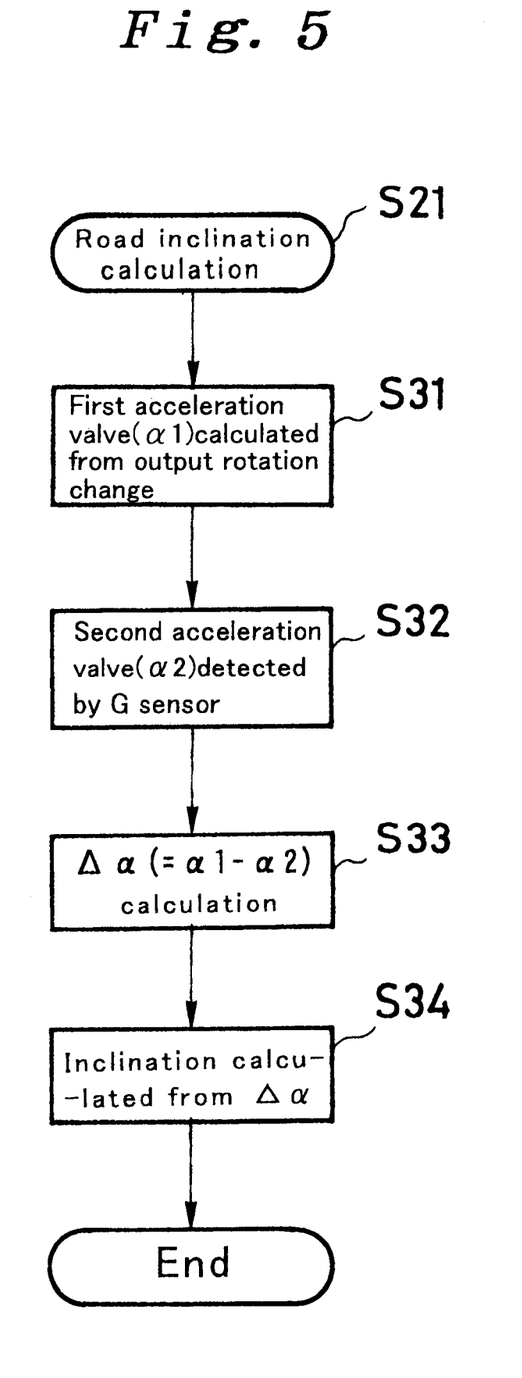
FIG. 5 is a flowchart which describes road inclination calculation steps, which are executed in the drive-mode neutral termination control.

FIG. 4 shows this termination determination control. In this control, the inclination (A) of the road on which the vehicle is traveling is calculated at Step S21. A routine for this road inclination calculation, which is shown in FIG. 5, is described in detail at first. In this calculation, at first, the acceleration of the vehicle in the traveling direction is calculated from the change of the output rotation of the transmission detected by the output rotation sensor 40 (or from the change of the vehicle speed) at Step S31 (the value calculated here is referred to as "first acceleration α1"). Then, the acceleration of the vehicle in the traveling direction is detected by the acceleration sensor 38 at Step S32 (this value detected here is referred to as "second acceleration α2"). After that, the difference between the first acceleration value and the second acceleration value is calculated at Step S33 (Δα=(α1−α2)).

Here, the first acceleration α1 is the acceleration of the vehicle in the traveling direction calculated from the rate of change of the vehicle speed while the second acceleration α2 is the value detected by the acceleration sensor (G sensor) 38, which is affected by the gravitational acceleration. The acceleration sensor 38 is arranged or adjusted to detect the acceleration in the traveling direction of the vehicle while the vehicle is traveling on a horizontal ground so that the detection will not be affected by the gravitational acceleration. For example, if the vehicle is inclined on a slope in the traveling direction, then a component of the gravitational acceleration that corresponds to this inclination is included in the detected value. Therefore, the above calculated difference (Δα=(α1−α2)) is caused by this component of the gravitational acceleration, which corresponds to the inclination of the vehicle. Thus, the inclination of the vehicle at the moment, i.e., the inclination (A) of the road on which the vehicle is traveling at the time, is calculated from the difference Δα at Step S34.

Figure 10:
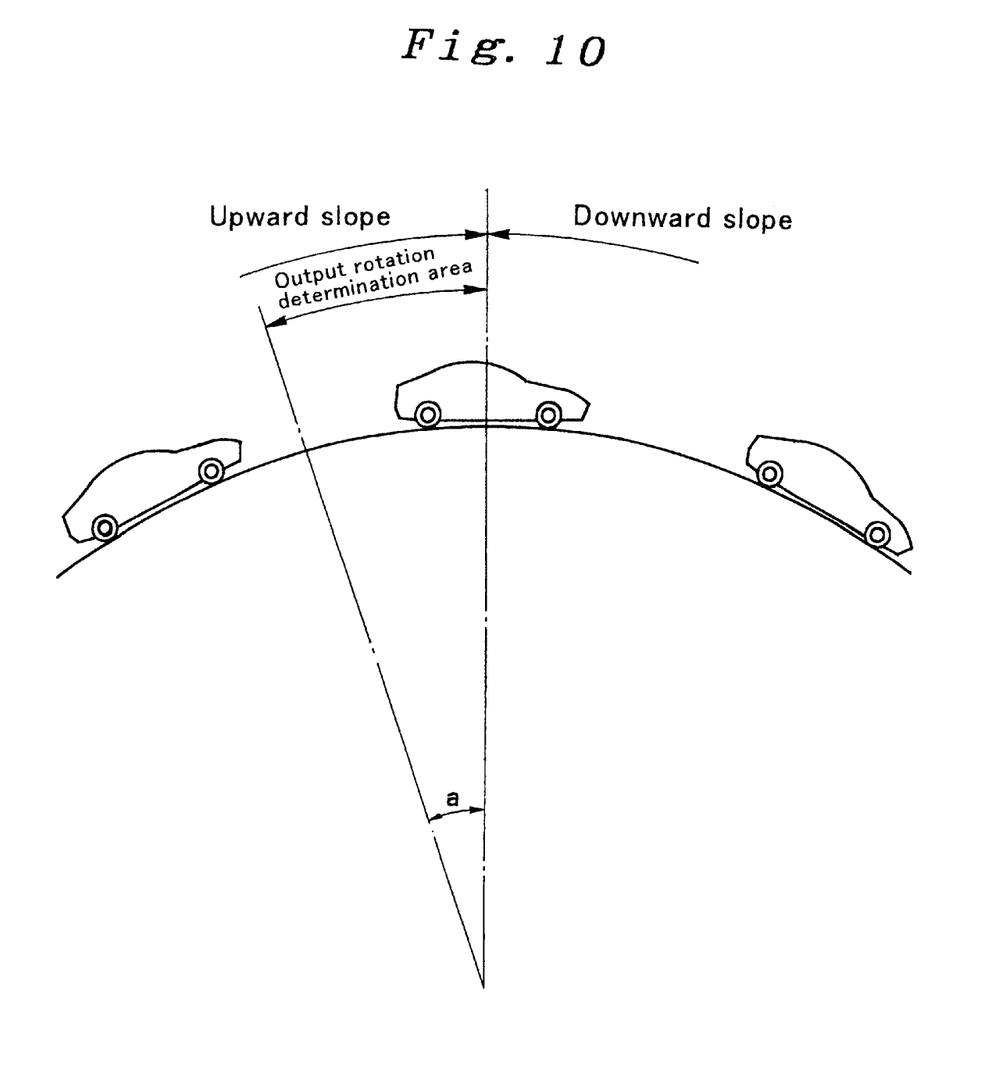
FIG. 10 is an illustration which shows the inclination of the road to be calculated in the above mentioned road inclination calculation.

Now, returning to FIG. 4, after the road inclination (A) is calculated at Step S21, the control flow proceeds to Step S22, where a determination is made whether or not this calculated road inclination (A) is equal to or smaller than a predetermined inclination (a) (for example, 2 degrees for an upward slope). FIG. 10 shows this determinant. If the upward slope has a road inclination (A) which is larger than the predetermined inclination (a) (a=2 degrees), then the control flow proceeds to Step S28, where the ordinary drive control is executed. This is because if the vehicle is stopped with the transmission set in the above described neutral condition on such an upward slope, then the vehicle may recede when it is to be started. On the other hand, if the calculated road inclination (A) is equal to or smaller than a predetermined inclination (a), i.e., A≦a, in other words, if the vehicle is traveling on a road which is sloped not very much upward or downward or which is substantially flat, then the control flow proceeds to Step S23, where the deceleration (B) of the vehicle at the moment is detected. Then, at Step S24, a determination is made whether or not this deceleration (B) is equal to or smaller than a predetermined deceleration (b) (for example, 0.3 G). If the detected deceleration (B) is greater than the predetermined value (in this example, B>0.3 G), then the control flow proceeds to Step S28, where the ordinary drive control is executed. The reason is that when the deceleration (B) is greater than the predetermined value (b), the calculation of the road inclination performed at Step S21 tends to become inaccurate. To circumvent this problem, the ordinary drive control is executed instead.

On the other hand, if the deceleration (B) is equal to or smaller than the predetermined value (b), i.e., B≦b, then the control flow proceeds to Step S25, where a determination is made whether the accelerator is turned on or not (i.e., if the accelerator pedal is pressed or not). Then, at Step S26, a determination is made whether the brake pedal is turned off or not (i.e., if the brake pedal is released and the brake switch 36 is turned off or not). If the accelerator is turned on, or the brake is turned off, then such a condition is taken as an indication that the driver intends to keep driving. Therefore, the control flow proceeds to Step S28, where the ordinary drive control is executed. On the other hand, if the accelerator is turned off (i.e., substantially closed) and the brake is turned on, then the drive-mode neutral control is continued.

Figure 6:
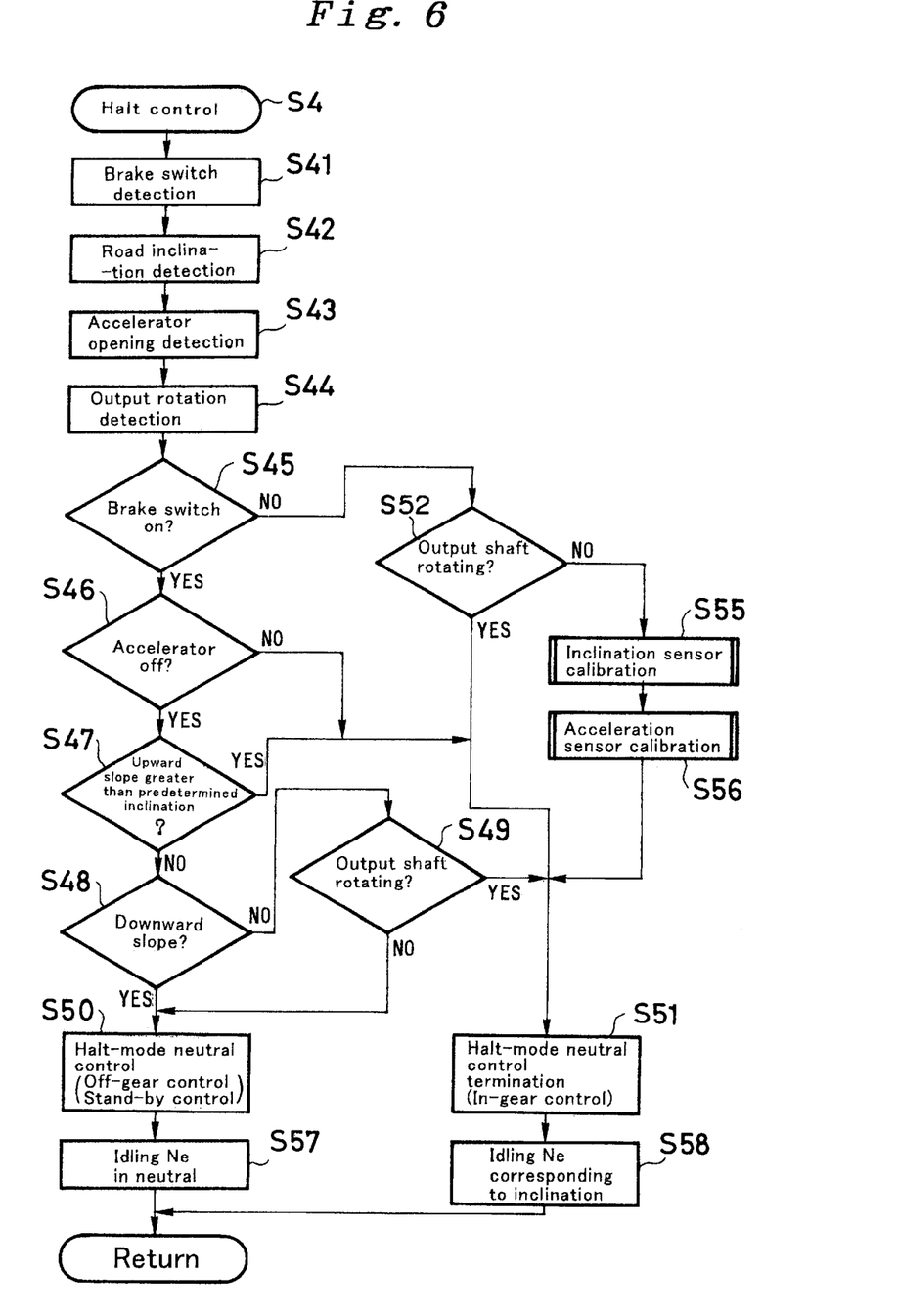
FIG. 6 is a flowchart which describes a vehicle halt control routine, which is a part of the automatic shift control executed for the forward drive range.

Now, the halt control executed at Step S4 is described in detail in reference to FIG. 6. This control is to be executed when the vehicle is stationary with the transmission set in the forward drive range. For example, it can be executed to control the vehicle which has come into a halt after the execution of the drive-mode neutral control at Step S3, which is described above.

In the halt control, the condition of the brake switch 36, i.e., whether the brake switch 36 is on or off, is detected at Step S41, and then, the inclination of the road in the traveling direction where the vehicle is stationary (i.e., in the front and rear direction of the vehicle) is detected at Step S42. This detection of the road inclination is carried out by the inclination sensor 37, which is provided in the vehicle. However, while the vehicle was decelerating before coming into a halt, the inclination of the road was already calculated at Step S21 of the drive-mode neutral termination determination control (Step S15) shown in FIG. 4. This inclination calculated just before the vehicle has come into the halt may be used as the present road inclination, instead. Then, at Step S43, the accelerator opening of the engine E is detected by the accelerator sensor 31, and the rotation of the output member (i.e., the transmission output shaft 3 or the drive shaft 4), i.e., the rotation of the wheels W, is detected by the output rotation sensor 40 at Step S44.

Then, at Step S45, a determination is made whether the brake switch 36 is on or not. If the brake switch 36 is off, then it is considered that the driver intends to start the vehicle. In this case, the halt-mode neutral control should not be performed, so the neutral control is terminated, and an in-gear control (the initialization of the starting clutch, for example, the LOW clutch 21) may be started. In this control system, the inclination sensor 37 and the acceleration sensor 38 are recalibrated automatically at this stage. In the following section, this calibration process is described in detail.

As mentioned previously, the inclination sensor 37 is used for detecting the inclination of the road at Step S42 while the acceleration sensor 38 is used for detecting the acceleration of the vehicle in the traveling direction at Step S32. The values measured by the detection are used in the drive-mode neutral control and in the halt-mode neutral control. If positional errors exist because the sensors are mounted inaccurately, then the measured values will be inaccurate. In addition, the ambient temperature change can affect the accuracy, and also, the aging of the sensors can present the same problem.

To solve this problem, if the result of the determination at Step S45 is that the brake switch 36 is off, then the control flow proceeds to Step S52, where a determination is made whether or not the output rotation is detectable by the output rotation sensor 40. If the result of the determination is that the output member, for example, the transmission output shaft 3, is rotating even a little, then the control flow proceeds to Step S51, where the halt-mode neutral control is terminated, and/or the in-gear control (the initialization of the starting clutch, for example, the LOW clutch 21) may be started. On the other hand, if the result of the determination at Step S52 is that there is no output rotation, then the control flow proceeds to Step S55 and then to Step S56, where the inclination sensor 37 and the acceleration sensor 38 are calibrated automatically.

Figure 7:
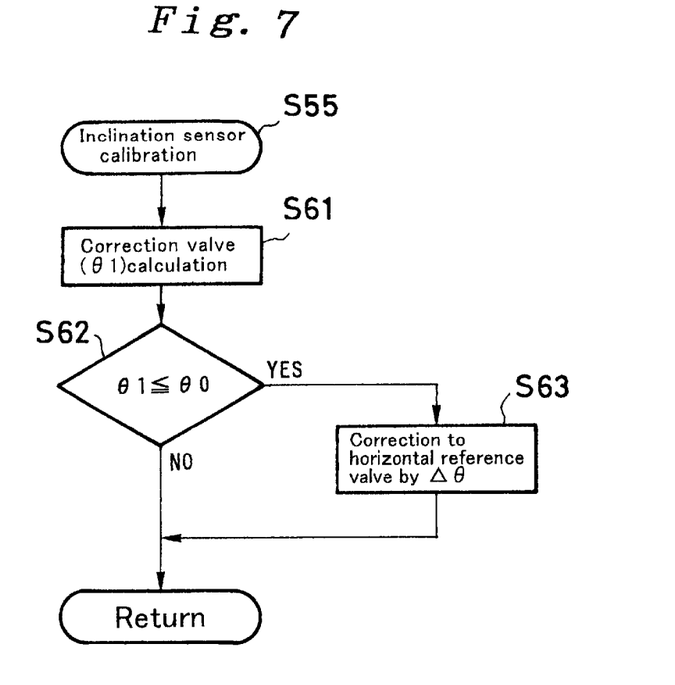
FIG. 7 is a flowchart which describes an inclination sensor compensation control routine, which is a part of the vehicle halt control.
Figure 8:
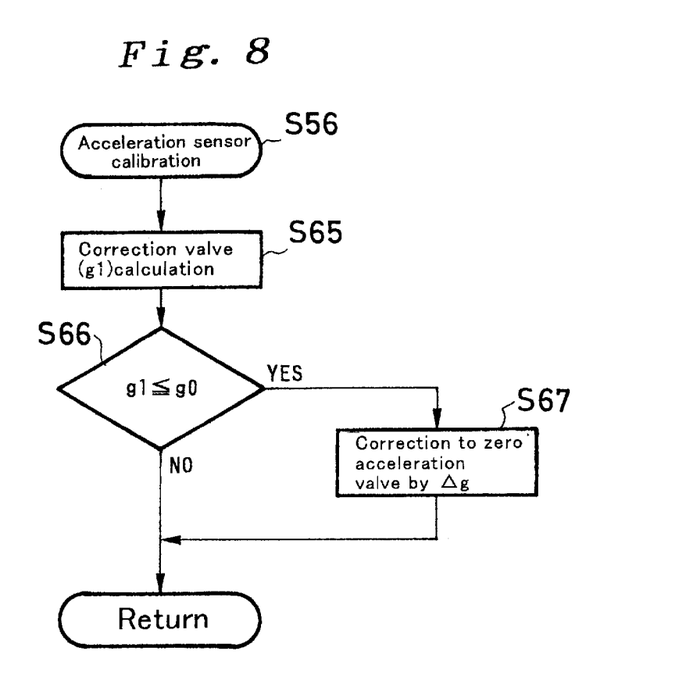
FIG. 8 is a flowchart which describes an acceleration sensor compensation control routine, which is a part of the vehicle halt control.

FIGS. 7 and 8 show routines performed for the automatic calibration of the inclination sensor 37 and the acceleration sensor 38. At first, the calibration of the inclination sensor 37 is described in reference to FIG. 7. While the halt-mode neutral control is executed, if the brake switch 36 is turned off, the control flow proceeds to Step S51, where the halt-mode neutral control is terminated, and the in-gear control is started. Here, immediately after the brake switch 36 is turned off, the transmission is still in the neutral condition. If the output member is not rotating in this instance, then it is considered that the vehicle is stationary on a flat and level surface of the road. In this condition, the inclination sensor 37 should indicate that the road is level. Therefore, a difference ($\theta1$) between the actual value measured by the inclination sensor 37 and a horizontal reference value which indicates the levelness is calculated at Step S61. In other words, the correction value ($\theta1$) which is necessary to adjust the measured value to the horizontal reference value is calculated at Step S61.

Figure 9:
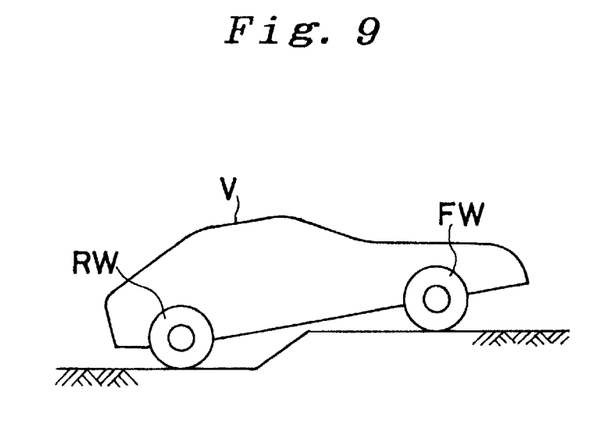
FIG. 9 is a schematic diagram which shows a condition where the vehicle is kept stationary.

Then, at Step S62, a determination is made whether or not this correction value ($\theta1$) is within a range which should be considered as the error caused by the inclination sensor 37, in other words, whether or not the correction value ($\theta1$) is smaller than a predetermined value ($\theta0$). This is to take into consideration such a condition as shown in FIG. 9, where both the front wheels FW and the rear wheels RW are on flat or horizontal surfaces but on different levels or heights of the road. In this condition, the output member does not rotate, but the inclination sensor 37 detects an inclination. In this case, because the correction value is larger than the predetermined value ($\theta1>\theta0$), the calibration is not performed on the inclination sensor 37. If the result of the determination is that the correction value is equal to or smaller than the predetermined value ($\theta1\leq\theta0$), then the control flow proceeds to Step S63, where the calibration is executed. Here, the calibration is performed not by a lump sum at once but in steps by a predetermined correction value ($\Delta\theta$), which is very small. Therefore, the measured value is brought gradually to the horizontal reference value, and the number of repetition taken for this calibration process is recorded for later reference.

The calibration of the acceleration sensor 38 is executed at Step S56 in the same manner as the inclination sensor 37. If the output member is not rotating in the neutral condition immediately after the brake switch 36 is turned off, then it is considered that the vehicle is stationary on a level surface. In this condition, the acceleration sensor 38 receives no acceleration in the vehicle's traveling direction as well as no gravitational acceleration. Therefore, the difference between the actual value measured by the acceleration sensor 38 and a zero acceleration value is calculated as a correction value (g1) at Step S65 as shown in FIG. 8.

Then, at Step S67, a determination is made whether or not this correction value (g1) is smaller than a predetermined value (g0), i.e., whether or not it is within a range which should be considered as the error caused by the acceleration sensor 38. This is to take into consideration such a condition as shown in FIG. 9, where both the front wheels FW and the rear wheels RW are on flat or horizontal surfaces but on different levels or heights of the road. In this condition, the output member does not rotate, but the acceleration sensor 38 detects an effect of the gravitational acceleration. In this case, because the correction value is larger than the predetermined value (g1>g0), the calibration is not performed on the acceleration sensor 38. If the result of the determination is that the correction value is equal to or smaller than the predetermined value (g1$\leq$g0), then the calibration is performed to bring the value from the detection by the acceleration sensor 38 to the zero acceleration value by correcting with a predetermined correction value ($\Delta$g), which is also a very small value. Therefore, the measured value is brought gradually to the zero acceleration value.

If the result of the determination at Step S45 is that the brake switch 36 is on, then the control flow proceeds to Step S46, where another determination is made whether the accelerator is off or not. If the accelerator is on, then it is considered that the driver intends to start the vehicle. Therefore, the control flow proceeds to Step S51, where the halt-mode neutral control is terminated, and/or the in-gear control (the initialization of the starting clutch, for example, the LOW clutch 21) is started.

On the other hand, if the accelerator is off, then the control flow proceeds to Step S47, where a determination is made whether or not the road on which the vehicle is stationary is sloped upward with an inclination that is equal to or greater than the predetermined inclination (a). This determination is executed in the same way as Step S22 in FIG. 4, and whether or not the road inclination (A) is equal to or greater than the predetermined inclination (a) (refer to FIG. 10) is determined. If the result of the determination at Step S47 is that the road inclination is equal to or greater than the predetermined inclination (A$\geq$a), then the control flow proceeds to Step S51, where the halt-mode neutral control is terminated, and/or the in-gear control (the initialization of the starting clutch, for example, the LOW clutch 21) is started.

If the road inclination is smaller than the predetermined inclination (A<a), then the control flow proceeds to Step S48, where a determination is made whether the road on which the vehicle is stationary is sloped downward or not. If the road is sloped downward, then there is no possibility that the vehicle should experience a starting delay. Therefore, the control flow proceeds to Step S50, where the halt-mode neutral control is executed to set the transmission into a neutral condition. As described previously, the halt-mode neutral control comprises an off-gear control and a stand-by control. The off-gear control reduces the hydraulic pressure of the THIRD speed clutch 23 (or the SECOND speed clutch 22) to a predetermined pressure and starts supplying a hydraulic pressure to the LOW clutch 21, and the stand-by control releases the hydraulic pressure of the THIRD speed clutch 23 (or the SECOND speed clutch 22) but maintain the hydraulic pressure of the LOW clutch 21 at a stand-by pressure, following the off-gear control. Here, the road inclination downward is detected if it is equal to or greater than a predetermined inclination, which is set to zero or to a few degrees.

On the other hand, if the road is determined to have an upward slope at Step S48, i.e., if the upward inclination of the road is determined to be within the predetermined inclination (a) (in the output rotation determination area shown in FIG. 10), then the control flow proceeds to Step S49, where another determination is made whether or not any output rotation is detected by the output rotation sensor 40. If the output member, for example, the transmission output shaft 3, is determined to be rotating even a little, then the control flow proceeds to Step S51, where the halt-mode neutral control is terminated, and/or the in-gear control (the initialization of the starting clutch, for example, the LOW clutch 21) may be started. On the other hand, if there is no output rotation, then the control flow proceeds to Step S50, where the halt-mode neutral control is continued.

In the halt-mode neutral control executed at Step S50, the operation of the engine E is controlled by the engine output control device 50 to adjust the idling rotation of the engine to a minimum rotational speed that allows the engine to rotate smoothly without any engine stall, which may otherwise occur depending on the temperature of the engine cooling water. In this way, the fuel efficiency of the vehicle is improved. This idling engine rotational speed control is performed by adjusting the opening of a secondary air passage of the engine. Also, if the engine is equipped with a drive-by-wire type throttle control device, then the electronic control unit ECU can control the throttle opening to adjust the rotational speed of the engine.

Figure 11:
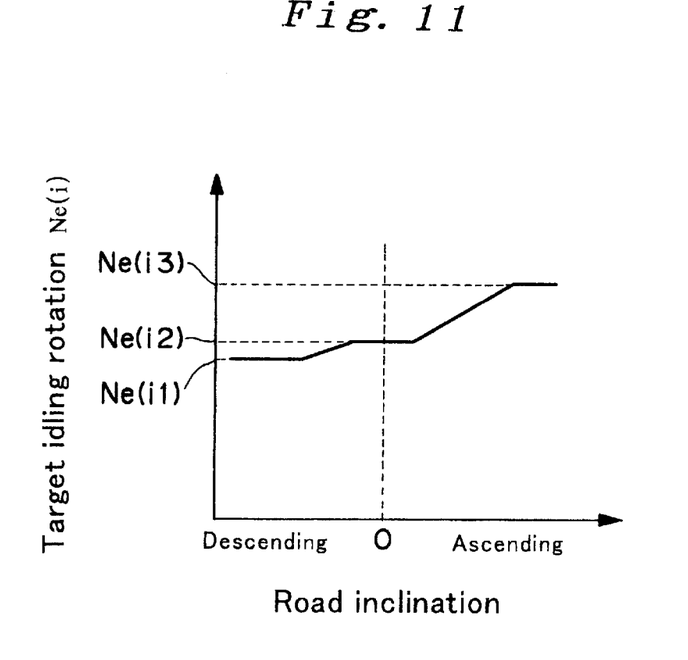
FIG. 11 is a graph which shows target idling rotational speeds to be established in response to the inclination of the road, which has been calculated in the inclination calculation.

On the other hand, if the control flow proceeds to Step S51, then the halt-mode neutral control is terminated, and the in-gear control is started. In this case, a target idling rotational speed Ne(i) is set in correspondence to the road inclination detected at Step S42, and the engine output control device 50 is controlled to bring the rotation of the engine to this target idling rotational speed Ne(i). As shown in FIG. 11, this target idling rotational speed Ne(i) is set differently as Ne(i1) for a downward slope (descending road), as Ne(i2) for a flat road and as Ne(i3) for an upward slope (ascending road). More specifically, the target engine rotational speed Ne(i2) for a flat road is set to 600~800 rpm; the target engine rotational speed Ne(i1) for a descending road is set about 50 rpm lower than the rotational speed Ne(i2); and the target engine rotational speed Ne(i3) for an ascending road is set about 200 rpm higher than that for a flat road.

However, in a case where the engine output control device 50 comprises a device which adjusts the opening of a secondary air passage, the target engine rotational speed Ne(i3) for an ascending road is set as a maximum idling rotational speed which is achieved by opening the secondary air passage while the accelerator is turned off. On the other hand, in a case where the engine output control device 50 comprises a drive-by-wire type throttle control device, an upper limit is set for the target engine rotational speed Ne(i3) for an ascending road, and this upper limit is determined such that while the drive range is selected, the clutch can engage with as small an impact as not to make the driver feel that something is wrong.

In the above described halt control, a basic control (halt-mode neutral control) is to set the transmission into a neutral condition if the brake is on and the accelerator is off after the vehicle has come into a halt with the transmission in the forward drive range. However, if the road on which the vehicle has stopped is sloped upward with an inclination equal to or greater than a predetermined inclination (a), then the halt-mode neutral control is not executed. Also, the halt-mode neutral control is terminated when the brake is turned off. However, in this case, in consideration of the fact that there is a delay between the actual turning off of the brake operation and the turning off of the brake switch 36, the system is arranged such that even though the brake switch 36 is not yet turned off, if the output member of the transmission rotates even a little, the halt-mode neutral control is terminated to avoid a delay in the starting of the vehicle. Also, for a descending road whose inclination is relatively small, the system may be arranged to terminate the halt-mode neutral control when the output member starts rotating.

Furthermore, in the above described halt control, when the brake is released and the halt-mode neutral control is terminated, the output of the engine (target engine rotational speed) can be adjusted in correspondence to the inclination of the road surface where the vehicle is stopped. In this way, the vehicle is prevented from receding on an ascending road. Otherwise, after the vehicle is stopped on an upward slope, when the brake is turned off, and the in-gear control (which controls the engagement of a clutch that establishes a low speed ratio in the forward drive range for starting the vehicle) is started, there has been a possibility of the vehicle's receding depending on the inclination of the road.

This problem is eliminated because the control system according to the present invention provides a relatively large forward driving force at the start of the in-gear control. Moreover, when the vehicle is started on a descending road, the vehicle tends to move easily and smoothly only by the release of the brake pedal. In such a case, the vehicle often experiences an impact of the gearing in. The control system according to the present invention can prevent this problem of an in-gear shock to start the vehicle smoothly by setting the target engine rotational speed to a relatively low level.

For the above described control, the inclination sensor 37, the acceleration sensor 38, the output rotation sensor 40, etc. are important. If any of the sensors experiences a failure, then the control will become unstable and unreliable. To circumvent this problem, the control system monitors these sensors, and if any failure is detected, then the control system will not execute the drive-mode neutral control and the halt-mode neutral control. Furthermore, the calibration of the inclination sensor 37 at Step S63 is executed gradually, and the number of repetition of this process taken for the calibration is recorded. While this number is small, i.e., while it is considered that the calibration has not completed, for the drive-mode neutral control, the control system adjusts the engine output (target engine rotational speed), which is decided in accordance with the road inclination, to a value which is determined for a maximum possible inclination as a safety precaution.

Also, if the control system detects a failure in the operation of the engine output control device 50, i.e., the secondary air passage control device or the drive-by-wire type throttle actuator, then the control system will not execute the drive-mode neutral control and the halt-mode neutral control.

As described above, when a control to establish one of the speed ratios of a forward drive range (in-gear control) is initiated for a vehicle which is stationary with the brake on and the accelerator off and with the automatic transmission set in a neutral condition while the forward drive range is selected, the control system according to the present invention adjusts the engine output which is input into the transmission by an engine output control device. As a result, the starting and the creeping of the vehicle after the brake pedal is released is executed promptly and smoothly because the power of the engine input into the automatic transmission is adjusted appropriately by the engine output control device.

For example, in a case where the vehicle has stopped on an ascending road, the control system can increase the engine output by the engine output control device to achieve a relatively large creeping force. In this way, the vehicle is prevented from receding, or the amount of the receding can be greatly reduced. As a result, the starting and the creeping of the vehicle is controlled without any clumsiness. Also, in a case where the vehicle has stopped on a descending road, the control system can decrease the engine output to make smaller the creeping force which is available when the in-gear control is initiated. In this way, the starting of the vehicle is controlled smoothly without any in-gear shock.

Thus, it is preferable that the control system be equipped with an inclination detector which detects the inclination of the road in the direction of the vehicle's traveling. With this arrangement, the engine output is adjusted by the engine output control device in correspondence to the inclination detected by the inclination detector. If the inclination detected indicates that the road is sloped upward, then the control system increases the engine output by the engine output control device. On the other hand, if the inclination detected indicates that the road is sloped downward, then the control system decreases the engine output by the engine output control device.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A control system for a vehicular automatic transmission whose operation is automatically controlled for selecting and establishing a speed ratio from a plurality of speed ratios in response to condition of a vehicle set in a drive range, wherein:
said control system is arranged to create a neutral condition if said vehicle is stationary with a brake being actuated and an accelerator for an engine being turned off while said transmission is set in said drive range; and
said control system comprises an engine output control device that adjusts engine output being input into said transmission when said transmission in said drive range, after having been set in said neutral condition, leaves said neutral condition and starts to establish a predetermined speed ratio in said drive range, wherein while said transmission is in said neutral condition, a frictionally engaging element used for establishing said predetermined speed ratio is set in a stand-by condition where said frictionally engaging element is ready to start engaging immediately.

2. The control system as set forth in claim 1, wherein: while said transmission in said drive range is set in said neutral condition, if said brake is released or said accelerator is turned on, said control system terminates said neutral condition.

3. The control system as set forth in claim 1, wherein: while said vehicle is stationary and said transmission in said drive range is set in said neutral condition, if there is a rotational change of an output shaft of said transmission, said control system terminates said neutral condition.

4. The control system as set forth in claim 1, wherein: if said vehicle is traveling at a speed which is equal to or higher than a predetermined speed, if
temperature of hydraulic oil for said transmission is equal to or lower than a first predetermined temperature, if temperature of cooling water for said engine is equal to or lower than a second predetermined temperature, or if said drive range is a low speed drive range, then said control system will not allow said neutral condition to be created.

5. A control system for a vehicular automatic transmission whose operation is automatically controlled for selecting and establishing a speed ratio from a plurality of speed ratios in response to condition of a vehicle set in a drive range, wherein:
said control system is arranged to create a neutral condition if said vehicle is stationary with a brake being actuated and an accelerator for an engine being turned off while said transmission is set in said drive range: and
said control system comprises an engine output control device that adjusts engine output being input into said transmission when said transmission in said drive range, after having been set in said neutral condition, leaves said neutral condition and starts to establish a predetermined speed ratio in said drive range; and
said control system further comprises an inclination detector which detects an inclination of a road surface in a direction of said vehicle's traveling, wherein said engine output control device adjusts said engine in correspondence to said inclination detected by said inclination detector.

6. The control system as set forth in claim 5, wherein:
if said inclination in said vehicle's traveling direction is equal to or greater than a predetermined inclination, indicating that said road surface is sloped upward equal to or in excess of a predetermined upward slope value, then said control system will not allow said neutral condition to be created.

7. The control system as set forth in claim 5, wherein:
if said inclination in said vehicle's traveling direction detected by said inclination detector indicates that said road surface is sloped upward, then said engine output control device increases said engine output.

8. The control system as set forth in claim 5, wherein:
if said inclination in said vehicle's traveling direction detected by said inclination detector indicates that said road surface is sloped downward, then said engine output control device decreases said engine output.

9. The control system as set forth in claim 5, wherein:
said inclination detector comprises a first acceleration sensor, which calculates said vehicle's acceleration in said traveling direction from a rotational change of an output shaft of said transmission, and a second acceleration sensor, which detects an acceleration force acting on said vehicle; and
said inclination detector calculates said inclination of said road surface from a difference between values detected by said first and second acceleration sensors, said difference corresponding to a component of gravitational acceleration.

10. The control system as set forth in claim 5, wherein:
while said transmission in said drive range is set in said neutral condition, if said brake is released or said accelerator is turned on, said control system terminates said neutral condition.

11. The control system as set forth in claim 5, wherein:
while said vehicle is stationary and said transmission in said drive range is set in said neutral condition, if there is a rotational change of an output shaft of said transmission, said control system terminates said neutral condition.

* * * * *